United States Patent [19]

Mauro et al.

[11] Patent Number: 5,034,239

[45] Date of Patent: Jul. 23, 1991

[54] STARCH JELLY CANDY

[75] Inventors: David J. Mauro, Dolton, Ill.; Susan L. Furcsik, Lake Station; William P. Kvansnica, Hammond, both of Ind.

[73] Assignee: American Maize-Products Company, Stamford, Conn.

[21] Appl. No.: 540,367

[22] Filed: Jun. 19, 1990

[51] Int. Cl.[5] ........................ A23G 3/00; A23L 1/0522

[52] U.S. Cl. .................................... 426/578; 426/660; 426/658; 426/661

[58] Field of Search ................ 426/578, 660, 658, 661

[56] References Cited

U.S. PATENT DOCUMENTS

| | | | |
|---|---|---|---|
| 3,218,177 | 11/1965 | Robinson et al. | 426/660 |
| 3,265,508 | 8/1966 | Wurzburg et al. | 426/660 |
| 3,265,509 | 8/1966 | Wurzburg et al. | 426/660 |
| 3,446,628 | 5/1969 | Schoch et al. | 426/578 |
| 3,687,690 | 8/1972 | Moore | 426/660 |
| 4,073,959 | 2/1978 | Durand | 426/578 |
| 4,120,987 | 10/1978 | Moore | 426/572 |
| 4,225,627 | 9/1980 | Moore | 426/548 |
| 4,428,972 | 1/1984 | Wurzburg | 426/578 |
| 4,567,055 | 1/1986 | Moore | 426/578 |
| 4,704,293 | 11/1987 | Moore et al. | 426/578 |
| 4,726,957 | 2/1988 | Lacourse et al. | 426/578 |
| 4,770,710 | 9/1988 | Friedman et al. | 536/102 |
| 4,774,328 | 9/1988 | Friedman et al. | 426/578 |
| 4,789,557 | 12/1988 | Friedman et al. | 426/578 |
| 4,790,997 | 12/1988 | Friedman et al. | 426/578 |
| 4,792,458 | 12/1988 | Friedman et al. | 426/578 |
| 4,798,735 | 1/1989 | Friedman et al. | 426/578 |
| 4,874,628 | 10/1989 | Eden et al. | 426/578 |
| 4,886,678 | 12/1989 | Chiu | 426/578 |

OTHER PUBLICATIONS

"A Text Book on Candy Making" by Alfred E. Leighton, The Manufacturing Confectioner Publishing Company, Copyright 1952—Lesson 8—Pectin Jellies and Their Manufacture-pp. 78-103.

*Primary Examiner*—Jeanette Hunter

*Attorney, Agent, or Firm*—Lucas & Just

[57] ABSTRACT

A starch jelly candy is made from starch from a plant of the dull sugary-2 (dusu2) homozygous genotype and a thin-boiled starch. The mixture is cooked at the temperature of below 300° F. (150° C.) instead of the conventional cooking temperature of 340° F. (170° C.). The starch jellies made in accordance with the present invention have substantially the same organoleptic and water retention characteristics as conventional starch jellies.

20 Claims, No Drawings

STARCH JELLY CANDY

This invention relates to a starch jelly candy and more particularly to a starch jelly candy made from a starch jelly formulation comprising a starch obtained from a plant having a dull sugary-2 (dusu2) homozygous genotype.

Starch jelly candy, also known as jelly gum confections, gum drops, gum slices, fruit gums, or jelly beans, is typically made from a starch jelly candy formulation of a sweetener, a starch composition and water. The starch composition provides texture and body to the starch jelly candy as well as water retention properties.

Starch jelly candies are conventionally made using a starch composition of high amylose starch in combination with thin-boiled starch. High amylose starch is a starch which contains at least 40% amylose which are obtained from a starch-bearing plant having a homozygous genotype amylose extender amylose extender (aeae). Thin-boiled starch is a starch which has been chemically treated with an acid in order to decrease the viscosity of a slurry made with the starch. See, for example, U.S. Pat. Nos. 3,218,177 issued Nov. 16, 1965; 3,265,509 issued Aug. 9, 1966; and 4,726,957 issued Feb. 23, 1988.

Typically, starch jelly candies are made by cooking the starch jelly candy formulation at a temperature of about 340° F. (170° C.); depositing the homogeneous fluid mixture into molds; and cooling the mixture to form a final solid product.

One problem associated with conventional starch jelly candies is the need for a high energy input to cook the high amylose starch in order to fully gelatinize the high amylose starch. There is a need in the candy industry to decrease the amount of energy needed to manufacture starch jelly candy.

It has now been discovered that a starch jelly candy made from a starch jelly candy formulation which contains as an essential ingredient therein a starch obtained from a plant having a dull sugary-2 homozygous genotype, that a cooking temperature below 300° F. (150° C.) or lower may be employed. The decrease of cooking temperature from 340° F. (170° C.) to 300° F. (150° C.), i.e. the decrease of 40° F. (20° C.) in the cooking temperature, translates into savings of energy and time during processing of the starch jelly candy formulation. In addition, there is decreased time needed to cool the formulation once it has been molded.

Starch jellies made in accordance with the present invention have substantially the same organoleptic characteristics such as taste, mouth feel, body and texture, as well as similar water retention characteristics as compared to conventional starch jellies.

It is both surprising and unexpected that a starch obtained from a plant having a dull sugary-2 homozygous genotype is suitable for use in a starch jelly candy since it is known that such starch has utility as a thin-thick canning starch. See U.S. Pat. No 4,792,458, incorporated herein by reference. It is not expected that a starch suitable for a thin-thick canning is also suitable for use in starch jelly candies.

A starch jelly candy made in accordance with the present invention is made from a starch jelly candy formulation comprising a sweetener, a starch composition comprising a thin-boiled starch, and a starch obtained from a plant having a dull sugary-2 homozygous genotype, and water.

The starch jelly candy of the present invention is made by forming the starch jelly candy formulation of the present invention; heating the formulation to about 280° F. (140° C.) or more; and then molding the formulation. Preferably, the starch jelly candy formulation is heated to a temperature between about 265° to about 275° F. (130°-135° C.)

Suitably the starch jelly formulation of the present invention comprises about 1% to about 25% by weight starch composition. More preferably it comprises about 5% to about 20% by weight. Good results have been obtained using about 10% to about 15% by weight.

The starch composition used to make the starch jelly candy formulation in accordance with the present invention preferably comprises about 10% to about 90% by weight thin-boiled starch and about 10% to about 90% by weight dusu2 starch. More preferably the starch composition comprises about 30% to about 70% by weight thin-boiled starch and about 70% to about 30% by weight dusu2 starch. Even more preferred is a starch composition that is about 40% to about 60% by weight thin-boiled starch and about 60% to about 40% by weight dusu2 starch. A 50:50% by weight mix has produced good results.

The term "dusu2 starch" as used in the specification and claims herein means not only the substantially pure starch granules as extracted from a starch-bearing plant that has a dusu2 genotype but also grain products of the starch granule such as flour, grit, hominy, and meal, so long as these starches have not been chemically modified or treated to substantially alter the makeup of the anhydroglucose monomeric units or the polymeric structure of the starch.

Any plant source which produces edible starch and which can be crossbred to produce a plant having a dusu2 homozygous genotype may be used to obtain the dusu2 starch which is used to make a starch jelly candy in accordance with the present invention. It has been found that cereal grains such as maize contain the dull (du), and sugary-2 (su2), genotypes. Maize is the preferred plant source for the starches used in the present invention.

The terms "dull sugary-2" or "dusu2" genotype as used in the specification and claims mean not only the dusu2 homozygous genotype, dudusu2su2, which has been obtained by standard plant breeding techniques, but also the dusu2 genotype which has been moved to another portion of the plant genome by translocation, inversion, or any other method of chromosome engineering to include variations thereof whereby the disclosed properties of the starch used in the present invention are obtained.

Preferably the thin-boiled starch has a fluidity of about 10 ml. to about 50 ml. and, more preferably, about 15 ml. to about 40 ml. Better results are obtained using a starch with a fluidity of about 20 ml. to about 35 ml.

Any suitable starch can be used for the thin-boiled starch. Suitable starches include potato, rice, maize and wheat. Maize is the preferred source. Preferably, a common corn starch is used for the thin-boiled starch.

Preferably the thin-boiled starch used in accordance with the present invention is suitably made by forming a slurry of about 5% to 40% by weight of a common corn starch and adding a mineral acid to the slurry while heating the slurry to about 90° to 120° F. (30° to 50° C.). The treatment with the acid lasts for about 1 to about 100 hours during which time the slurry is constantly agitated. Subsequently, the slurry is neutralized, dewatered, washed and dried in a conventional manner.

The sweetener used in the starch jelly formulation of the present invention suitably comprises corn syrup having a DE between about 30 to about 90 and a sugar component. The sugar component can be conventional sugars such as monosaccharides, disaccharides, or trisaccharides. Suitable monosaccharides include glucose, fructose, ribose, arabinose, mannose, xylose, galactose, or mixtures thereof. Suitable disaccharides include sucrose, maltose, cellobiose, lactose, trehalose, or mixtures thereof. Suitable trisaccharides include maltotriose, raffinose, cellotriose, manninotriose, or mixtures thereof. The sugar component of the sweetener can also be a high intensity sweetener such as saccharine, aspartame or Acesulfame-K. Mixtures of various conventional sugars and/or high intensity sweeteners can also be used. It is preferred to use sucrose as the sugar component of the sweetener.

The sweetener suitably comprises about 20% to about 90% by weight corn syrup and about 80% to about 10% by weight of the sugar component. It is preferred to use about 30% to about 80% by weight corn syrup and about 70% to about 20% by weight of the sugar component. It is most preferred to use about 40% to about 70% by weight corn syrup and about 60% to about 30% of the sugar component.

The amount of sweetener used varies depending on the desired sweetness and the other ingredients used in the starch jelly candy. Suitably the amount of sweetener added is about 25% to about 75% by weight of the starch jelly candy formulation of the present invention.

A flavoring and coloring component such as natural flavorants, artificial flavorants, coloring agents, fats, oils, surfactants, humectants, vitamins, or preservatives may also be included in the starch jelly candy of the present invention.

The natural flavorant can be a fruit flavorant such as a fruit puree, a fruit puree concentrate or dehydrated fruit solids. The natural flavorant can also be a spice flavorant.

If the flavoring and coloring component is used to make the starch jelly candy, it can be added in the amount of up to about 10% by weight of the starch jelly formulation. Preferably the starch jelly candy formulation contains about 0% to 10% by weight of a flavoring and coloring component.

Water is added to the starch jelly formulation as needed to dissolve the solid components of the formulation. Water is suitably added in the amount of between about 20% and 75% by weight of the starch jelly candy formulation of the present invention.

In order to make a starch jelly candy in accordance with the present invention, first the components of the formulation are combined and stirred together in a container and the contents of the container are heated up to about 280° F. (140° C.). conventional piece of equipment, such as a scraped surface heat exchanger or a jet cooker, is used to heat and mix the formulation. After heating, the starch jelly candy formulation is deposited into a mold and allowed to set. Except for the reduced temperature at which the contents are cooked, as compared to conventional cooking temperatures for starch jelly candies, the steps for forming the starch jelly candy are conventional and conventional equipment can be employed.

It will be evident to those of skill in the art that the starch jelly candy formulation of the present invention can be heated to a higher temperature than 280° F. (140° C.) without having deleterious effect on the starch jelly candy.

These and other aspects of the present invention may be more fully understood with reference to the following examples:

EXAMPLE 1

This example compares a starch jelly candy made in accordance with the present invention to a conventional starch jelly candy:

TABLE 1

| | Amount (% by Weight) | |
|---|---|---|
| Ingredients | PRESENT INVENTION | CONVENTIONAL |
| Corn Syrup | 45 | 44.9 |
| Sugar (Sucrose) | 31 | 32.0 |
| 90 Thin-boiled Starch (from common corn) | 6.0 | 7.4 |
| dusu2 Starch | 6.0 | 0 |
| Conventional High Amylose Starch | 0 | 3.1 |
| Water | 12.0 | 12.4 |

The starch jelly candy of the present invention was made by combining all the ingredients in a heated vessel, and thoroughly mixing all the ingredients until the mixture was brought to 110° F. (45° C.). Then, the heated mixture was pumped through a continuous cooker (jet cooked) at 265° F. (130° C.). The cooked material was collected and deposited into starch molds. When the depositing was completed the starch molds were stored in a heated room at 110°-120° F. (45°-50° C.) until the starch jelly formulation had set. After the set was completed the starch jellies were able to be demolded for additional processing. The conventional starch jelly candy was made in a manner similar to the starch jelly candy of the present invention except a jet temperature of 320° F (160° C) was required.

The organoleptic characteristics such as taste, mouth feel, body and texture, as well as the water retention characteristics, of the starch jellies made in accordance with the present invention as compared to conventional starch jellies, were substantially similar.

In order to determine fluidity of the thin-boiled starch used in the present invention, the following procedure was used.

A size sample of 54 g of fluidized starch was placed in a 600 ml beaker. To this was added 150 ml of distilled water, at 75° F. (24° C.), to make a smooth paste. To this paste was added 150 ml of 3.6% NaOH @75° F. The paste was then stirred for one minute. The stirred sample was then placed in a 75° F. water bath for 29 minutes. A 100 mm diameter pyrex 60° angle funnel which has a stem (I.D. 0.8 cm) measuring 9 cm from the vertex of the funnel and fitted with a stainless steel tip (1/32 inch opening) was used for the test. The funnel is filled to a level ob 2 cm below the rim of the funnel and paste is allowed to flow through the funnel and the stem for exactly one minute, keeping the level of paste in the funnel constant. Prior to collecting the paste, the paste is allowed to flow through the funnel and the stem for 20 seconds to condition the funnel stem and the tip. The paste is collected in a graduated cylinder and allowed to settle for 60 seconds. Then the volume was read and reported as fluidity (in mls) after correcting using the following formula:

| Amount of Paste Collected | |
|---|---|
| 25 ml or under - | 1. for each $H_2O$ unit over 10, subtract 0.5. |
| | 2. for each $H_2O$ unit under 10, add 1.0. |
| 26–74 ml - | 1. for each $H_2O$ unit over 10, subtract 0.5. |
| | 2. for each $H_2O$ unit over 10, add 0.5. |
| 75 mls or over - | 1. for each $H_2O$ unit over 10, subtract 1.0. |
| | 2. for each $H_2O$ unit under 10, add 0.5. |

To assure proper fluidity results the funnel and tip must dispense 100 mls of laboratory grade water (75° F.) in 60 seconds, following the above procedure.

It will be understood that the claims are intended to cover all the changes and modifications of the preferred embodiments of the invention herein chosen for the purpose of illustration which do not constitute a departure from the spirit and scope of the invention.

What is claimed is:

1. A starch jelly candy comprising a cooked gelled starch formulation wherein said formulation having contained;

(a) a sweetener;

(b) about 1% to about 25% by weight of a starch composition comprising about 10% to about 90% by weight a thin-boiled starch and about 90% to about 10% by weight a dull sugary-2 starch; and (c) water.

2. The starch jelly candy of claim 1 wherein said formulation comprises:

about 2% to about 75% by weight of said sweetener;

about 90% to about 10% by weight thin-boiled starch; said dull sugary-2 starch is obtained from maize;

about 20% to about 75% by weight water; and further comprising:

about 0% to about 10% by weight of a flavoring and coloring component.

3. The starch jelly candy of claim 2 wherein said sweetener comprises a corn syrup having a DE between about 30 to about 90, and a sugar component selected from the group consisting of monosaccharides, disaccharides, trisaccharides, high intensity sweeteners, and mixtures thereof.

4. The starch jelly candy of claim 3 wherein said sweetener comprises about 20% to about 90% by weight corn syrup and about 80% to about 10% by weight of a sugar component.

5. The starch jelly candy of claim 4 wherein the sugar component is sucrose.

6. The starch jelly candy of claim 5 wherein said flavoring and coloring component is comprised of one or more elements selected from the group consisting of natural flavorants, artificial flavorants, coloring agents, fats, oils, surfactants, humectants, vitamins, or preservatives.

7. The starch jelly candy of claim 6 wherein said natural flavorant is a fruit flavorant selected from the group consisting of fruit purees, fruit puree concentrate and dehydrated fruit solids.

8. A method for making a starch jelly candy comprising:

(a) forming a starch jelly formulation comprising:

(i) a sweetener;

(ii) about 1% to about 25% by weight of a starch composition comprising about 10% to about 90% by weight a thin-boiled starch and about 90% to about 10% by weight a dull sugary-2starch; and (iii) water;

(b) heating said starch jelly formulation to a temperature of about 265° F. to about 275 ° F. (130° F. -135° C.); and (c) molding said starch jelly formulation in candy molds to form said starch jelly candy.

9. The method of claim 8 wherein said starch jelly formulation comprises:

about 25% to about 75% by weight of said sweetener;

about 90% to about 10% by weight thin-boiled starch;

said dull sugary-2starch is obtained from maize;

about 20% to about 75% by weight water; and further comprising:

about 10% to about 10% by weight of a flavoring and coloring component.

10. The method of claim 8 wherein said sweetener comprises a corn syrup having a DE between about 30 to about 90, and a sugar component selected from the group consisting of monsaccharides, disaccharides, trisaccharides, high intensity sweeteners, and mixtures thereof.

11. The method of claim 8 wherein said sweetener comprises about 20% to about 90% by weight corn syrup and about 80% to about 10% by weight of a sugar component.

12. The method of claim 10 wherein the sugar component is sucrose.

13. The method of claim 9 wherein the flavoring and coloring component is comprised of one or more elements selected from the group consisting of natural flavorants, artificial flavorants, coloring agents, fats, oils, surfactants, humectants, vitamins, or preservatives.

14. The method of claim 13 wherein said natural flavorant is a fruit flavorant selected from the group consisting of fruit purees, fruit puree concentrate and dehydrated fruit solids.

15. A starch jelly formulation of making a starch jelly candy comprising:

about 25% to about 75% by weight of a sweetener;

about 1% to about 25% of a starch composition, said starch composition comprising about 10% to about 90% by weight of a dull surgary-2 starch obtained from maize;

about 90% to about 10% by weight a thin-boiled starch;

about 20% to about 75% by weight water; and about 0% to about 10% by weight flavoring and coloring component.

16. The starch jelly formulation of claim 15 wherein said sweetener comprises a corn syrup having a DE between about 30 to about 90, and a sugar component selected from the group consisting of monosaccharides, disaccharides, trisaccharides, high intensity sweeteners, and mixture thereof.

17. The starch jelly formulation of claim 16 wherein said sweetener comprises about 20% to about 90% by weight corn syrup and about 80% to about 10% by weight of a sugar component.

18. The starch jelly formulation of claim 17 wherein said flavoring and coloring component is comprises of one or more elements selected from the group consisting of natural flavorants, artificial flavorants, coloring agents, fats, oils, surfactants, humectants, vitamins, or preservatives.

19. The starch jelly of claim 18 wherein said thin-boiled corn starch is a thin-boiled common corn starch having a fluidity of about 10 ml. to about 50 ml.

20. The starch jelly formulation of claim 19 wherein said starch composition comprises about 50% by weight thin-boiled starch and about 50% by weight dull sugary-2 starch.

* * * * *

UNITED STATES PATENT AND TRADEMARK OFFICE

CERTIFICATE OF CORRECTION

PATENT NO. : 5,034,239

DATED : July 23, 1991

INVENTOR(S) : David J. Mauro et al.

It is certified that error appears in the above-identified patent and that said Letters Patent is hereby corrected as shown below:

Column 3, line 57, before "conventional" insert --Any--.

Column 4, line 59, change "ob" to --of--.

Column 4, line 64, after "funnel" insert --,--.

Column 5, line 67, change "2starch" to --2 starch--.

Column 6, line 2, change "130°F" to --130°C--.

Column 6, line 11, change "sugary-2starch" to --sugary-2 starch--.

Column 6, line 14, change the first "10%" to --0%--.

Column 6, line 35, change "of" to --for--.

Column 6, line 57, change "comprises" to --comprised--.

Signed and Sealed this

Twenty-ninth Day of December, 1992

*Attest:*

DOUGLAS B. COMER

*Attesting Officer* *Acting Commissioner of Patents and Trademarks*